United States Patent
Wu

(10) Patent No.: US 6,393,703 B1
(45) Date of Patent: May 28, 2002

(54) STRUCTURE FOR CONFINING A ROTATIONAL ANGLE OF A HANDLE OF GARDENING SHEARS

(75) Inventor: Shih-Piao Wu, Chang Hua Hsien (TW)

(73) Assignee: Jiin Haur Industrial Co., Ltd., Chang Hua Hsien (TW)

( * ) Notice: Subject to any disclaimer, the term of this patent is extended or adjusted under 35 U.S.C. 154(b) by 0 days.

(21) Appl. No.: 09/938,240

(22) Filed: Aug. 24, 2001

(51) Int. Cl.$^7$ ................................................. B26B 13/12
(52) U.S. Cl. ............................................ 30/232; 30/341
(58) Field of Search .......................... 30/232, 233, 231, 30/250, 254, 256, 261, 340, 341; 81/427.5

(56) References Cited

U.S. PATENT DOCUMENTS

| | | | | |
|---|---|---|---|---|
| 3,906,630 A | * | 9/1975 | Megna ........................ 30/341 |
| 5,659,959 A | * | 8/1997 | Parlowski ..................... 30/232 |
| 5,781,999 A | * | 7/1998 | Chang .......................... 30/232 |
| 5,787,589 A | * | 8/1998 | Auderset ...................... 30/261 |
| 6,260,277 B1 | * | 7/2001 | Wu .............................. 30/232 |

* cited by examiner

Primary Examiner—Hwei-Siu Payer
(74) Attorney, Agent, or Firm—Harrison & Egbert

(57) ABSTRACT

A pair of gardening shears includes a primary handle and a fixed secondary handle. The primary handle is formed of a shaft rod and a rotary grip. The shaft rod is provided with an annular slot and a flat edge. The rotary grip is provided with a locating member which has a locating arm and an angle-confining block. The rotary grip is positioned by the locating arm which is received in the annular slot of the shaft rod. The rotary grip is rotationally confined by the angle-confining block in conjunction with the flat edge of the shaft rod.

1 Claim, 6 Drawing Sheets

STRUCTURE FOR CONFINING A ROTATIONAL ANGLE OF A HANDLE OF GARDENING SHEARS

BACKGROUND OF THE INVENTION

1. Field of the Invention

The present invention relates generally to a pair of gardening shears, and more particularly to a handle confining structure of the gardening shears.

2. Description of Related Art

As shown in FIGS. 1–3, a pair of prior art gardening shears is provided with a handle rotating structure which comprises a rotary handle 10, a shaft rod 11, and a recovery spring 18. The shaft rod 11 is provided at the lower end with a locating slot 12. The handle 10 is provided with an engagement hole 13 corresponding in location to the locating slot 12 of the shaft rod 11. The handle 10 is provided in the upper segment with a longitudinal hole in communication with the engagement hole 13. The shaft rod 11 is provided at the upper end 15 with a protruded pillar 16. The handle 10 is provided at the upper end with an arcuate slot 17 in which the recovery spring 18 is disposed. The shaft rod 11 is received in the longitudinal hole of the handle 10 such that the protruded pillar 16 of the shaft rod 11 is received in the arcuate slot 17 of the handle 10, and that a bolt 14 is located in the locating slot 12 of the shaft rod 11 via the engagement hole 13 of the handle 10. As the handle 10 is turned, the recovery spring 18 is compressed by the protruded pillar 16. The handle 10 is forced by the spring force of the compressed recovery spring 18 to return to its original position. The protruded pillar 16 is frequently subjected to a lateral shear force and is therefore vulnerable to severance or damage. In addition, the recovery spring 18 is disposed in the arcuate slot 17 of the handle 10 in such a manner that one end of the recovery spring 18 is stopped by the inner wall of one end of the arcuate slot 17, and that other end of the recovery spring 18 urges the protruded pillar 16 of the shaft rod 11. Such an arrangement of the recovery spring 18 in the arcuate slot 17 makes the assembly of the prior art gardening shears difficult and costly.

BRIEF SUMMARY OF THE INVENTION

The primary objective of the present invention is to provide a pair of gardening shears with an efficient and cost-effective structure for confining the rotational angle of a primary handle of the gardening shears.

In keeping with the principle of the present invention, the foregoing objective of the present invention is attained by a rotation confining structure which is intended to confine the rotational angle of the primary handle and is formed of a position confining edge of a shaft rod of the primary handle, and a locating member of a rotary grip of the primary handle. The rotation confining effect is brought about by the position confining edge of the shaft rod and two inclined planes of the locating member of the rotary grip, without the use of the recovery spring.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
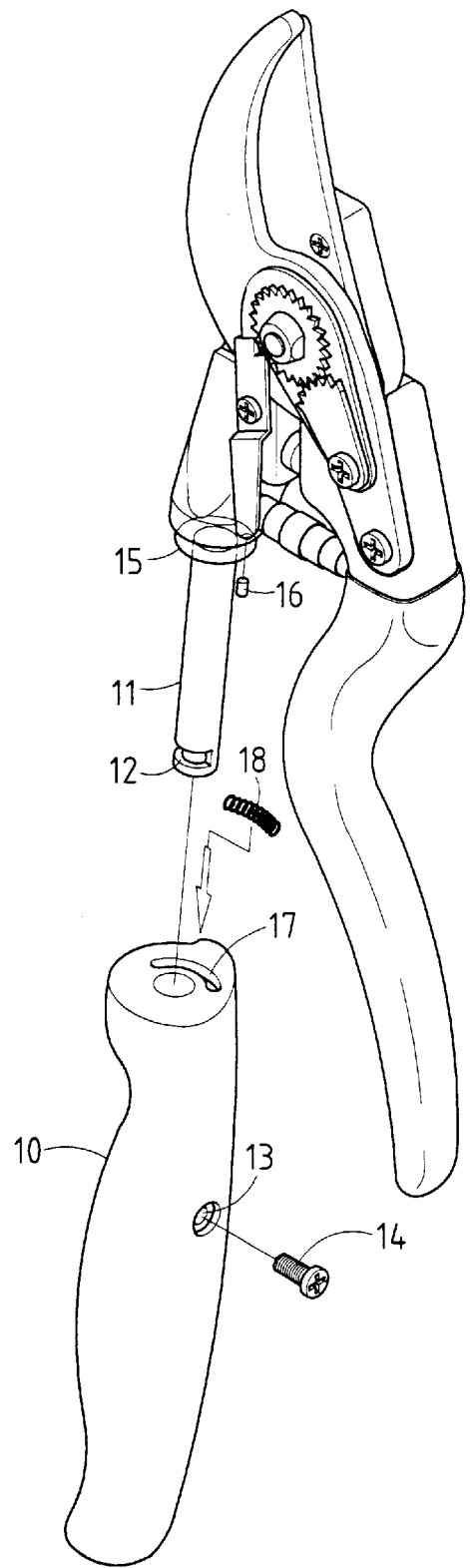
FIG. 1 shows an exploded view of a prior art structure.
Figure 2:
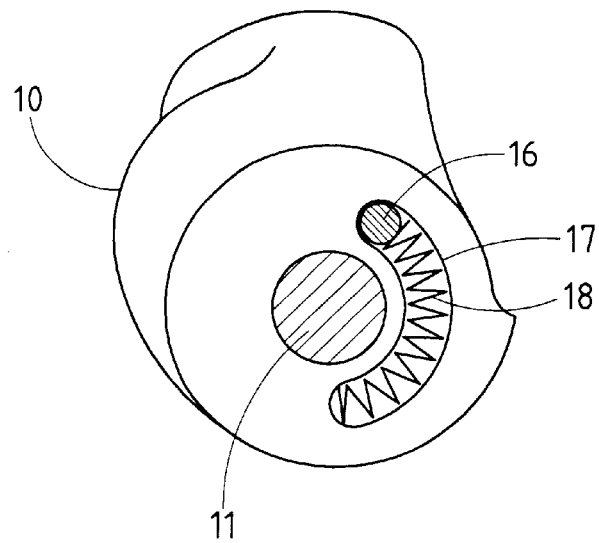
FIG. 2 shows a cross sectional view of the prior art structure.
Figure 3:
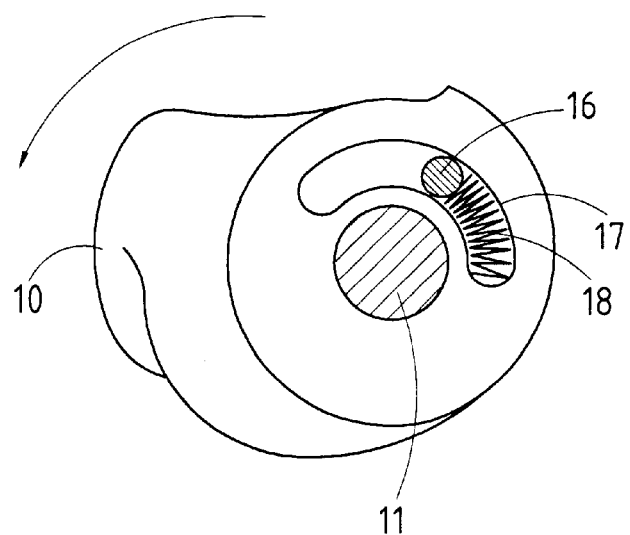
FIG. 3 shows a sectional schematic view of the prior art structure at work.
Figure 4A:
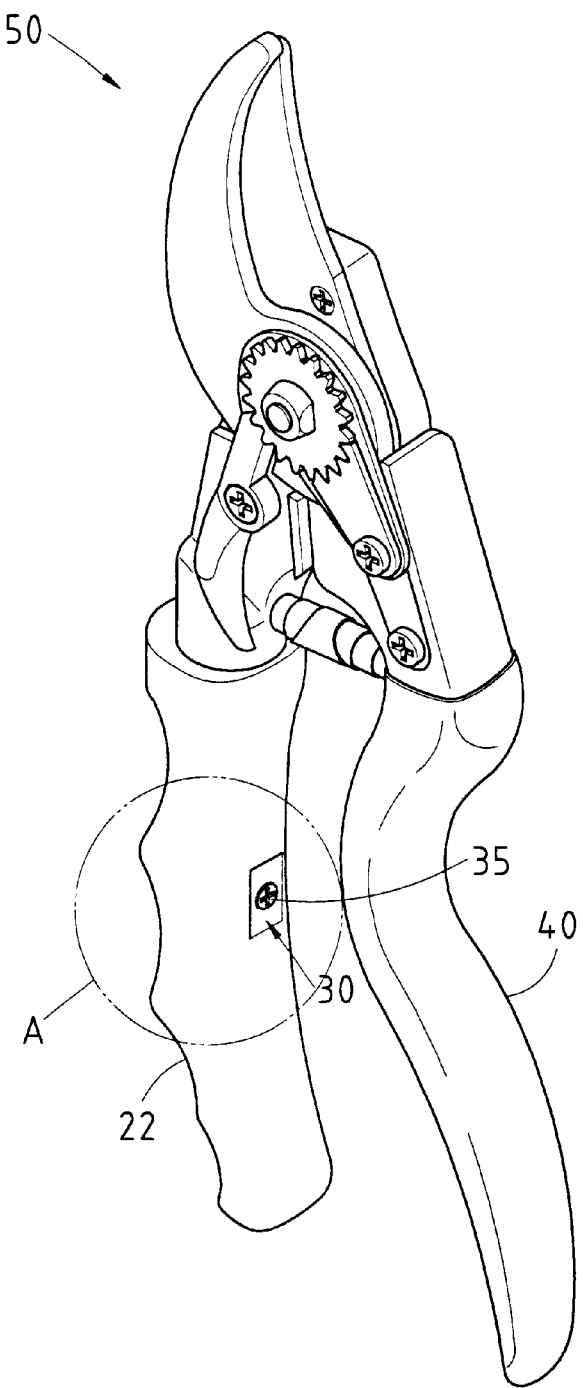
FIG. 4A shows a perspective view of the preferred embodiment of the present invention.
Figure 4B:
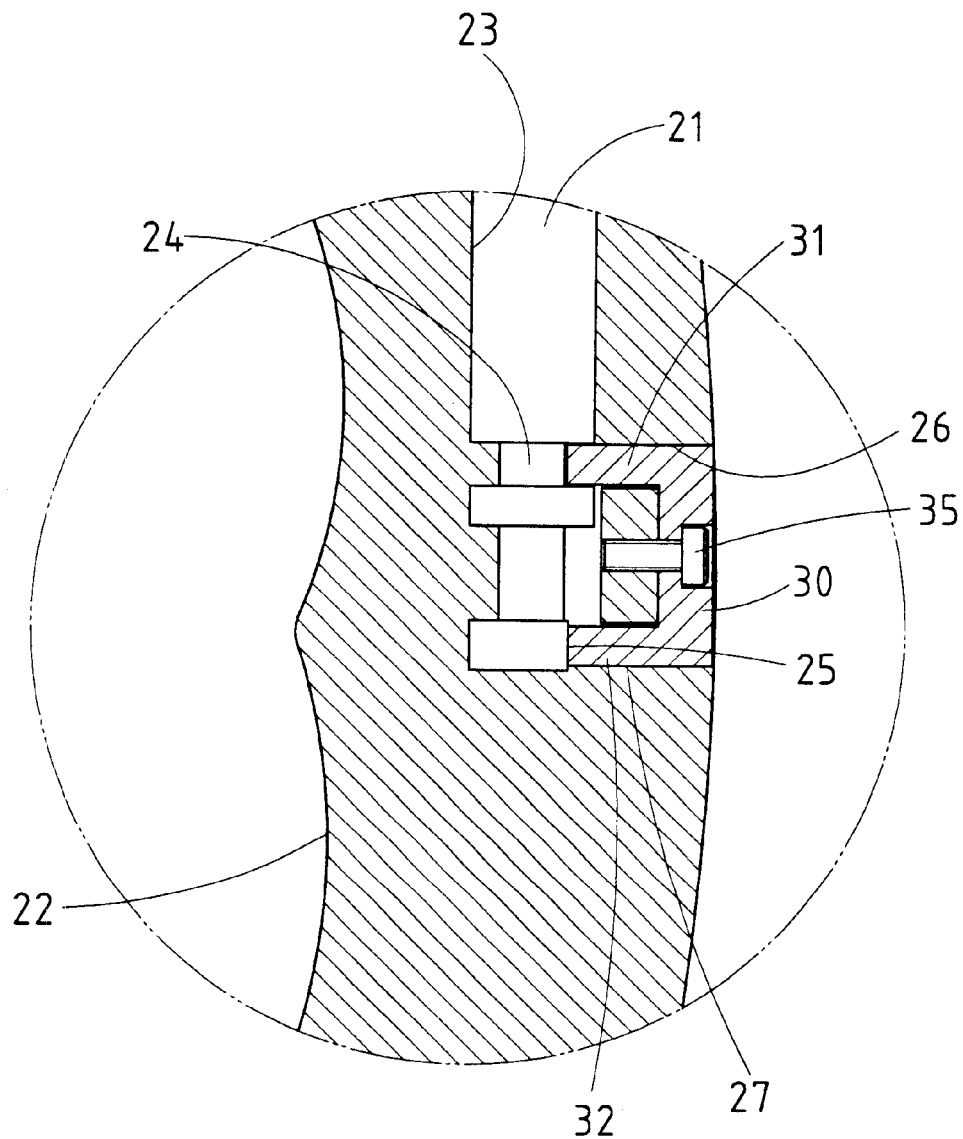
FIG. 4B shows a sectional view of a portion indicated by a circle "A" as shown in FIG. 4A.
Figure 5:
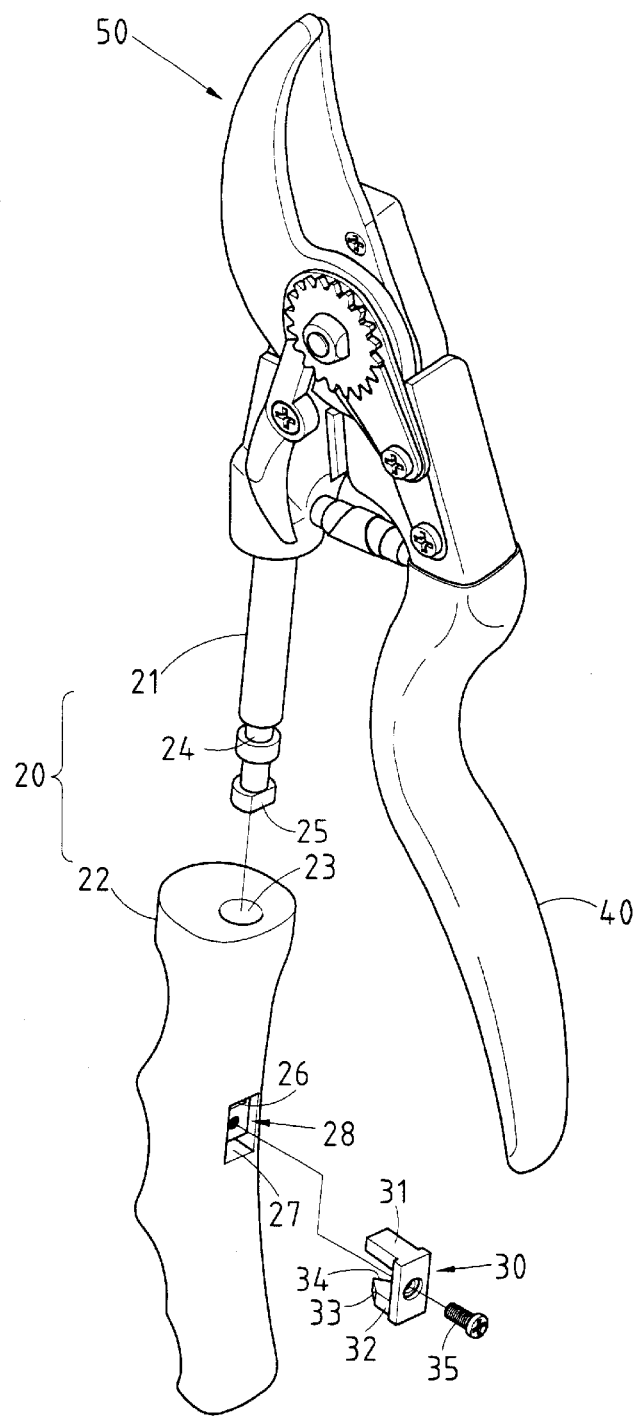
FIG. 5 shows an exploded view of the preferred embodiment of the present invention.

As shown in FIGS. 4A, 4B, and 5, a pair of gardening shears of the preferred embodiment of the present invention comprises a primary handle 20, a secondary handle 40, and a cutting portion 50. The primary handle 20 is rotary, whereas the secondary handle 40 is fixed. The present invention is characterized by the primary handle 20.

The primary handle 20 of the preferred embodiment of the present invention is formed of a shaft rod 21 and a rotary grip 22. The shaft rod 21 is provided at the lower end thereof with an annular slot 24 and a flat edge 25 located under the annular slot 24. The rotary grip 22 is provided with an axial hole 23 dimensioned to receive the shaft rod 21. The rotary grip 22 is provided in the midsegment with a first engagement hole 26 corresponding in location to the annular slot 24 of the shaft rod 21 and in communication with the axial hole 23 of the rotary grip 22, and a second engagement hole 27 corresponding in location to the flat edge 25 of the shaft rod 21 and in communication with the axial hole 23 of the rotary grip 22, and a mounting slot 28 for mounting a locating member 30. The first and the second engagement holes 26 and 27 are located in the mounting slot 28. The locating member 30 is provided with a locating arm 31, and an angle-confining block 32 which is opposite in location to the locating arm 31 and is provided with two inclined planes 33 and 34. The locating member 30 is fastened in the mounting slot 28 by a fastening bolt 35 such that the free end of the locating arm 31 of the locating member 30 is retained in the annular slot 24 of the shaft rod 21 via the first engagement hole 26, and that the angle-confining block 32 of the locating member 30 comes in contact with the flat edge 25 of the shaft rod 21 via the second engagement hole 27 of the rotary grip 22.

The rotary grip 22 is positioned by the locating arm 31 which is located in the annular slot 24 of the shaft rod 21 such that the rotary grip 22 is prevented from moving up and down in relation to the shaft rod 21.

Figure 6:
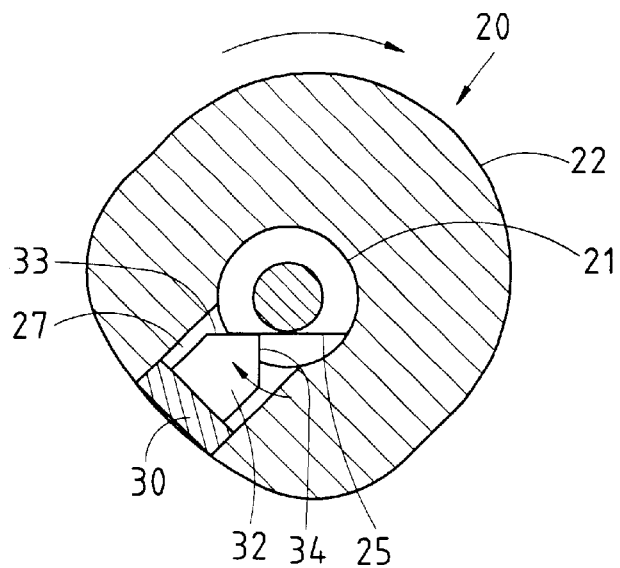
FIG. 6 shows a sectional schematic view of the preferred embodiment of the present invention at work.

As illustrated in FIG. 6, when the rotary grip 22 is turned clockwise, the first inclined plane 33 of the angle-confining block 32 of the locating member 30 comes in contact with the flat edge 25 of the shaft rod 21. As a result, the rotational angle of the rotary grip 22 is confined.

Figure 7:
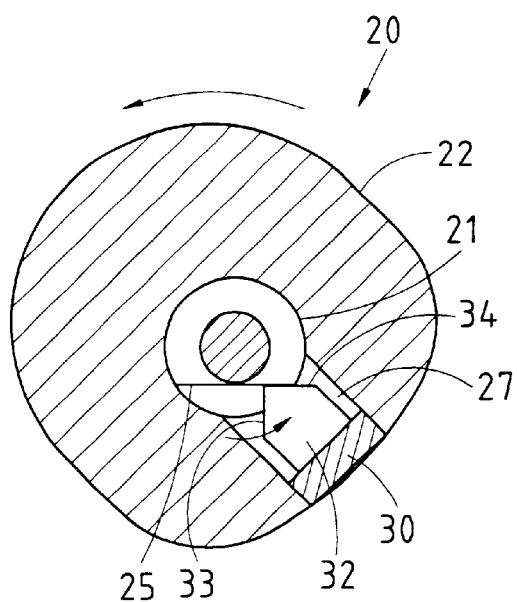
FIG. 7 shows another sectional schematic view of the preferred embodiment of the present invention at work.

As illustrated in FIG. 7, when the rotary grip 22 is turned counterclockwise, the second inclined plane 34 of the angle-confining block 32 of the locating member 30 comes in contact with the flat edge 25 of the shaft rod 21. As a result, the rotational angle of the rotary grip 22 is once again confined.

Unlike the protruded pillar 16 of the prior art structure, the flat edge 25 of the shaft rod 21 and the inclined planes 33 and 34 of the angle-confining block 32 of the locating member 30 are not susceptible to damage by the shearing action. In addition, the present invention is devoid of the prior art recovery spring 18 and is therefore relatively simple in construction and cost-effective.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following claim.

I claim:

1. A pair of gardening shears comprising:

a primary handle provided with a cutting portion fastened thereto; and a fixed secondary handle comprised of a cutting portion fastened thereto to cooperate with said cutting portion of said primary handle; wherein said primary handle comprises:

a shaft rod provided at one end with an annular slot and a flat edge located under said annular slot; and a rotary grip rotatably located by said shaft rod and provided with an axial hole to receive said shaft rod, said rotary grip further provided in a midsegment with a mounting slot, a first engagement hole located in said mounting slot and in communication with said axial hole, a second engagement hole located in said mounting slot and in communication with said axial hole, said rotary grip further comprised of a locating member which is fastened in said mounting slot and is provided with an angle-confining block having a first inclined plane and a second inclined plane, said locating member further comprised of a locating arm whereby said rotary grip is located by said locating member in conjunction with said shaft rod in such a manner that said locating arm of said locating member is located in said annular slot of said shaft rod via said first engagement hole of said rotary grip, so as to prevent said rotary grip from moving up and down in relation to said shaft rod, said rotary grip being confined rotationally in such a manner that said first inclined plane of said angle-confining block of said locating member comes in contact with said flat edge of said shaft rod via said second engagement hole of said rotary grip at such time when said rotary grip is turned clockwise, and such that said second inclined plane of said angle-confining block of said locating member comes in contact with said flat edge of said shaft rod via said second engagement hole of said rotary grip at such time when said rotary grip is turned counterclockwise.

* * * * *